United States Patent
Giraudo et al.

(10) Patent No.: US 9,248,699 B2
(45) Date of Patent: Feb. 2, 2016

(54) SEALING DEVICE, IN PARTICULAR FOR WHEEL HUBS OF MOTOR BIKES

(71) Applicant: Aktiebolaget SKF, Göteborg (SE)

(72) Inventors: Paolo Giraudo, Trana (IT); Alessandro Lo Conte, Turin (IT)

(73) Assignee: AKTIEBOLAGET SKF, Gothenburg (SE)

(*) Notice: Subject to any disclaimer, the term of this patent is extended or adjusted under 35 U.S.C. 154(b) by 190 days.

(21) Appl. No.: 14/040,074

(22) Filed: Sep. 27, 2013

(65) Prior Publication Data

US 2014/0084672 A1 Mar. 27, 2014

(30) Foreign Application Priority Data

Sep. 27, 2012 (IT) .............. TO2012A0845

(51) Int. Cl.
  *B60B 27/00* (2006.01)
  *F16J 15/32* (2006.01)
  *F16C 33/78* (2006.01)

(52) U.S. Cl.
  CPC ......... *B60B 27/0073* (2013.01); *B60B 27/001* (2013.01); *F16C 33/7836* (2013.01); *F16C 33/7879* (2013.01); *F16J 15/3256* (2013.01); *F16C 2326/02* (2013.01)

(58) Field of Classification Search
  CPC .................... B60B 27/0073; B60B 27/001
  USPC ............... 301/6.8, 5.309, 5.304, 108.3, 6.91, 301/37.33, 37.12, 63.102, 109
  See application file for complete search history.

(56) References Cited

U.S. PATENT DOCUMENTS

| | | | |
|---|---|---|---|
| 3,510,138 A | 5/1970 | Bowen et al. | |
| 4,376,541 A * | 3/1983 | Walter et al. | 277/353 |
| 4,596,394 A | 6/1986 | Schmitt | |
| 5,015,001 A | 5/1991 | Jay | |
| 5,149,207 A * | 9/1992 | Vignoito | 384/478 |
| 5,186,472 A * | 2/1993 | Romero et al. | 277/351 |
| 5,398,942 A * | 3/1995 | Duckwall et al. | 277/353 |
| 5,458,420 A * | 10/1995 | Otto | 384/448 |
| 6,357,757 B1 | 3/2002 | Hibbler | |
| 7,419,165 B2 * | 9/2008 | Toth et al. | 277/569 |
| 7,959,157 B2 * | 6/2011 | Dobbs et al. | 277/551 |
| 8,142,292 B2 * | 3/2012 | Ledford et al. | 277/566 |
| 8,474,825 B2 * | 7/2013 | Nakagawa | 277/353 |

(Continued)

FOREIGN PATENT DOCUMENTS

JP  062770 A  1/1994

*Primary Examiner* — Hau Phan
(74) *Attorney, Agent, or Firm* — Bryan Peckjian; SKF USA Inc. Patent Dept.

(57) ABSTRACT

A sealing device including an annular reinforcing insert couplable with a wheel hub in use and an annular sealing element carried by the reinforcing insert and including at least one sealing lip cooperating with a spacer carried by a wheel support pin in use; the reinforcing insert delimits an annular chamber arranged directly adjacent to the annular sealing element in axial direction, and the device further includes a shield mounted in floating manner with radial and axial play in the annular chamber, including a first radial end, which extends to the lip and couples in forced manner with the spacer in use, and a second radial end, opposite to the first, which cooperates with the reinforcing insert and with the annular sealing element to create a labyrinth seal in the annular chamber interposed in use between the annular lip and an environment (E) external to the wheel hub.

9 Claims, 1 Drawing Sheet

(56) References Cited

U.S. PATENT DOCUMENTS

| | | | |
|---|---|---|---|
| 8,668,390 B2* | 3/2014 | Schweitzer | 384/484 |
| 2004/0228556 A1* | 11/2004 | Ohtsuki et al. | 384/448 |
| 2005/0135717 A1* | 6/2005 | Monetti et al. | 384/484 |
| 2008/0019624 A1* | 1/2008 | Kubo | 384/147 |
| 2008/0159673 A1* | 7/2008 | Muranaka et al. | 384/448 |
| 2010/0052262 A1* | 3/2010 | Ishida | 277/349 |
| 2012/0098208 A1* | 4/2012 | Yamamoto et al. | 277/549 |

* cited by examiner

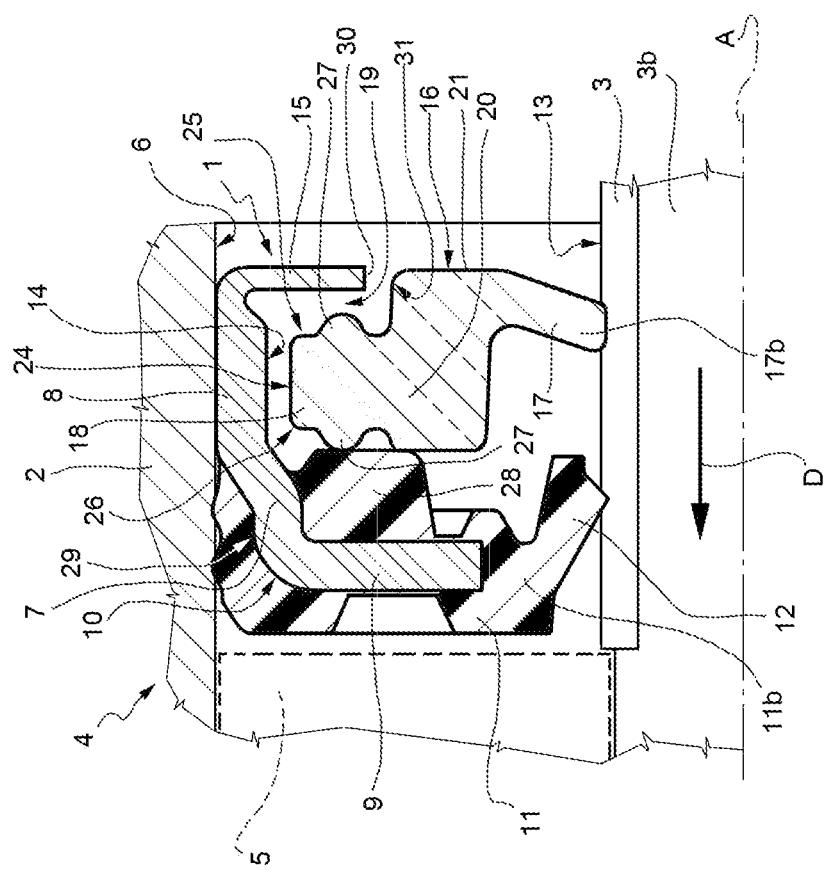

SEALING DEVICE, IN PARTICULAR FOR WHEEL HUBS OF MOTOR BIKES

CROSS-REFERENCE

This application claims priority to Italian patent application no. TO2012A000845 filed on Sep. 27, 2012, the contents of which are fully incorporated herein by reference.

TECHNICAL FIELD

The present invention relates to a sealing device, in particular for wheel hubs of motor bikes.

BACKGROUND ART

The problem of effectively protecting the rolling bearing which supports the wheel in motor bikes hubs, in particular on motor bikes intended for off-road use (cross, trial etc.) from external pollutants (water, mud, dust) arises, in particular in the presence of frequent washing of the motor bike with high-pressure water jets (pressure washers) and frequent disassembly of the wheel hub for maintenance and/or re-lubrication (grease application).

Until now, such problem has been solved by means of sealing devices comprising a stiff reinforcing insert, which is restrained to the wheel hub and which carries one or more additional lips, either crawling or not, known as dust seals, in addition to one or more dynamic elastic crawling sealing lips sliding on a wheel hub support pin or on a spacer carried by the pin, the pin in use being stationary and supported by the wheel shock absorbers. JP6001770A illustrates a particularly effective embodiment of such a solution.

However, the solution known from JP6001770A has relatively large axial dimensions, i.e. in the direction of the wheel support pin axis, which are incompatible with most applications. On the contrary, solutions based on additional sealing lips, possibly provided with particular geometries, while having smaller axial dimensions than the sealing device of JP6001770A are either not sufficiently effective or are relatively unreliable, in particular due to performance which decay over time.

It is the object of the present invention to provide a sealing device, in particular for wheel hubs of motor bikes, which can be inserted between two axial symmetry members relatively rotatable with respect to each other, which is free from the drawbacks described above, and which, in particular, has small dimensions, in particular in axial direction, high efficiency and reliability remaining constant over time, and high ease of assembly and disassembly, together with high simplicity and a relatively low production cost.

SUMMARY

According to the present invention, the sealing device is thus provided which can be inserted between two axial symmetry members relatively rotatable with respect to each other, in particular consisting of a wheel hub and a motor bike wheel support pin or possibly by a spacer fitted on the pin, as disclosed in claim 1.

The invention is further related to a wheel hub-pin coupling, either provided with a spacer or not.

The sealing device according to the invention allows to protect the sealing lip or lips which in use cooperate with the stationary member by creating a labyrinth seal by means of a particularly shaped shield made of plastic material which couples with the stationary member in use and which is mounted in floating manner in an annular chamber defined by a reinforcing insert supporting the sealing lip(s), the labyrinth seal protecting the sealing lip(s), when the wheel is stationary, for example while washing the motor bike, and which, in use, creates a centrifugation of the external contaminants by effect of the rotation of the annular chamber together with the wheel, which improves the sealing action of the device and extends its durability over time.

Hereinafter, for "mounted in a floating manner" is meant that the shield, when not engaged integral with the stationary member, may move freely in the chamber owing to an axial and radial play.

Furthermore, the sealing device according to the invention is particularly easy to assemble and disassemble by virtue of the particular funnel shape of the radially inner end of the shield which couples with the spacer carried by the wheel support pin.

Further features and advantages of the present invention will be apparent from the following description of a non-limitative embodiment thereof, made with reference to the FIGURE of the accompanying drawing, which shows a section radial view of a coupling between two relatively rotatable members between which a sealing device made according to the invention is arranged.

BRIEF DESCRIPTION OF THE DRAWING

With reference to FIG. 1, reference numeral 1 indicates as a whole a sealing device which can be inserted between a first member 2 and a second member 3 relatively rotatable with respect to each other about an axis A coinciding with an axis of symmetry of the sealing device 1 in use.

DETAILED DESCRIPTION OF THE INVENTION

According to the preferred embodiment of the invention, the sealing device 1 is intended to be inserted between a wheel hub 2, rotatable about axis A in use, and a respective element 3 defined by a spacer, of known type, mounted on a support pin or axle 3b of a motor bike wheel, known and not shown for sake of simplicity, intended to constitute a stationary element, i.e. not rotatable about axis A, in use. The spacer 3 is optional and the following description is applicable also in the case in which the spacer 3 is missing and the sealing device 1 is inserted directly between the wheel hub 2 and the pin 3b.

In particular, the accompanying FIGURE shows a radial section (only diagrammatically for sake of simplicity) of a coupling 4 between a wheel hub 2 of a motor bike (not shown) and a wheel support pin 3b, of known type, on which an optional spacer 3 is mounted, also of known type and thus illustrated only in part for sake of simplicity. The coupling 4 comprises, further to the wheel hub 2 and the spacer 3, a rolling bearing 5 mounted in known manner on the spacer 3 and at least one sealing device 1 according to the invention (generally two devices 1 arranged on opposite sides with respect to the bearing 5) inserted in an annular seat 6 defined between the wheel hub 2 and the spacer 3/pin 3b assembly, so as to make the wheel of the motor bike rotatable with respect with the element or member 3/3b.

The sealing device 1 comprises an annular reinforcing insert 7 made of a stiff, but elastically deformable material, such as a metallic material, e.g. steel; the reinforcing insert 7 comprises a sleeve portion 8 which can be restrained in angularly integral and fluid-tight manner to the first member 2 and a flange portion 9, which axially and overhangingly extends from a first end 10 of the sleeve portion 8.

The sealing device 1 further comprises an annular sealing element 11 made of an elastomeric material, in particular according to an aspect of the invention, a low friction material. The annular sealing element 11 comprises at least one elastically deformable annular sealing lip 12 adapted to cooperate in fluid-tight manner with a radial lateral surface 13 of the second member 3 in use. According to a possible variant (not shown), the annular sealing element 11 may comprise several annular sealing lips, possibly all radially cooperating with the surface 13.

In the non-limiting, illustrated embodiment, the at least one annular sealing lip 12 extends radially and overhangingly from the reinforcing insert 7, in particular from the flange portion 9, on the side opposite to the sleeve portion 8 and up to a first radial position, shown in the FIGURE; more in detail, the lip 12 radially extends overhangingly towards axis A from a root portion 11b of the annular sealing element 11; the lip 12 extends from the portion 11b also axially overhangingly, on the same side of the sleeve portion 8, parallel to axis A.

According to an aspect of the invention, the reinforcing insert 7 defines and delimits therein an annular chamber 14 radially open toward axis A and arranged directly adjacent in axial direction to the annular sealing element 11. Hereinafter, for "chamber" is meant an empty space delimited along at least three sides by lateral walls. In particular, the annular chamber 14 is delimited between the flange portion 9, arranged radially, the sleeve portion 8 and a second end 15 of the sleeve portion 8, opposite to end 10, also arranged radially since it has been folded to form a right angle in a radial direction on the same side as the flange 9, so as to form an L with the rest of the sleeve portion 8, in the illustrated example facing towards axis A and towards the flange portion 9, and arranged in front of the flange portion 9, axially spaced from the flange portion 9 itself.

According to a further aspect of the invention, the sealing device 1 further comprises also an annular shield 16 mounted in floating manner, with both radial and axial play, in the annular chamber 14; the shield 16 comprises a first radial end 17, radially inner in the illustrated example, which extends towards axis A and up to the annular lip 12, so as to entirely face the lip 12 in the radial direction and be axially spaced apart from the lip 12. Indeed, the definition "up to the annular lip 12" means that the radial end 17 extends to a second radial position, shown in the FIGURE, axially distanced and distinct from, but comparable to, the first radial position of the at least one annular lip 12. The end 17 is further shaped so as to be adapted to be coupled in forced manner in use, and thus with predetermined radial interference, with the stationary member 3 to restrain the entire shield 16 angularly integral with the member 3, i.e. with the spacer mounted on the wheel support pin 3b in the illustrated case in point. Of course, with the expression "mounted in a floating manner" hereinabove is meant that the shield 16 may move freely in the chamber 14 owing to the mentioned axial and radial play only when it is not engaged integral with the stationary member 3, i.e. when the sealing device 1 is dismounted from the wheel hub 2. Moreover, it has to be stressed that the floating mounting of the shield 16 within chamber 14 is useful to allow the friction generated by the sealing device 1 in use to be kept at a minimum, with only one or two points of contact between reinforcing insert 7 and shield 16, due to the possibility of the spindle (the wheel support pin 3b) to relatively move axially with respect to the wheel hub 2 within the play allowed by the bearing 5.

The annular shield 16 further comprises a second radial end 18, opposite to the end 17, in the illustrated case in point forming the radially outer end of the annular shield 16, which faces to the side of the sleeve portion 8 of the reinforcing insert 7 and which is housed within chamber 14 and cooperates with the sleeve portion 8 and with the annular sealing element 11 to create in the annular chamber 14 a labyrinth seal, indicated by reference numeral 19 as a whole, interposed in use between the at least one annular lip 12 and an environment indicated by letter E external to the first member 2 and the second member 3; thus, the labyrinth seal 19 is arranged in use axially displaced with respect to the sealing lip 12 towards the outside of the annular seat 6 and on the side opposite to that facing the bearing 5, interposed between lip 12 and the L-fold portion or end 15 of the sleeve portion 8 of the reinforcing insert 7.

According to an aspect of the invention, the shield 16 is made of a synthetic plastic material, preferably a polyurethane material, thus relatively much stiffer than the elastically deformable material of the annular sealing element 11 with the respective lip 12 and, thus, the shield 16, whilst being definable as essentially stiff with respect to the lip 12 is in all cases provided with a given elasticity, greater than that of the metallic material of which the reinforcing insert 7 is made.

The first radial end 17 of the shield radially and overhangingly extends beyond the annular chamber 14, which extends in radial direction along only part of the annular sealing element 11.

In particular, the annular chamber 14 is engaged only by the second radial end 18 of the shield 16, which in the embodiment in FIG. 1, has a central connection portion 20 between the radial ends 17 and 18 which extends in front of the annular sealing element 11, but not in front of the lip 12 and which, in radial direction, is arranged essentially flushed with the L-fold end 15 of the sleeve portion 8, while only the end 17 extends in front of the at least annular lip 12.

In practice, the extension in radial direction of the annular end 18 is only slightly smaller than that of the annular chamber 14, while the intermediate portion 20 has an essentially rectangular shape in radial section and an extension greater than that of the annular chamber 14 in axial direction; the L-fold end 15 extends radially towards axis A by a quantity such as not to reach the intermediate portion 20. A axial face 21 of the portion 20 facing the side opposite to the lip 12 is arranged flushed with the L-fold end 15 and from the portion 20 extends toward lip 12 the radially inner end 17 of the shield 16, which is shaped as a truncated cone funnel having a conicity thereof facing the annular lip 12.

The extension in axial direction of the end 17 is such that a free end 17b of the end 17 is arranged on the side opposite to the intermediate portion 20, essentially flushed with a radial frontal surface 25 of the end 18 facing the side opposite to the lip 12; furthermore, the thickness of the annular end 17 measured in axial direction is smaller than the extension in axial direction of the end 18. In this manner, the annular chamber 14 is delimited towards the outside of the seat 6 by the L-fold end 15 and closed towards axis A by the intermediate portion 20.

The shield 16 is shaped in radial section so that the end 17 forms (as described) a sort of asymmetric leg arranged on the side opposite to the lip 12 and directed obliquely with respect to axis A and towards the lip 12, in a direction D of insertion of the pin 3b and of the respective spacer 3 through the annular end 17 and through the annular lip 12 in use.

The radial end 18 of the shield 16 is shaped in radial section essentially as the upper part of a lower case letter "t". In particular, the end 18 is delimited by a lateral radial surface 24, parallel to the symmetry axis A and essentially flat, and by a pair of opposite frontal radial surfaces 25 and 26, perpendicular to the symmetry axis A; each radial frontal surface 25 and 26 is provided at a radial middle line portion thereof, with a respective annular projection 27, which extends axially and overhangingly from the respective radial frontal surface 25 or 26 and which has an arc of a circle profile in radial section.

The annular projection 27 of the surface 25 extends in front of, and cooperates with, the second radially L-fold end 15 of the sleeve portion 8 of the reinforcing insert 7; the annular projection 27 of the surface 26 extends in front of, and cooperating with, a portion 28 of the annular sealing element 11, which portion 28 is shaped as an annular block; the portion 28 extends on the flange portion 9 of the reinforcing insert 7, to cover at least partially the flange portion 9, and overhangingly extends towards the annular chamber 14 from the flange portion 9; in this manner, the projections 28 form the labyrinth seal 19 in the annular chamber 14 together with the radial lateral surface 24 of the end 18 of the shield 14.

The annular sealing element 11 together with the respective seal 12, is made (as mentioned above) of a low friction coefficient elastomer, e.g. NMR vulcanized rubber, and so as to extend up to a sleeve portion 8 and inside an annular step 29 obtained on the sleeve portion 8, radially on the side opposite to the flange portion 9 and in correspondence with the same, so as to exert a static seal on the first member 2 in use.

The annular portion or block 28, in addition to cooperating with the projection 27 of the surface 26 to form part of the labyrinth seal 19, has also the purpose to serve as an axial abutment for the shield 16 in direction D indicated by the arrow in the FIGURE, during the coupling operation with the stationary member (pin 3*b* and/or spacer 3, when present), allowing to ensure the correct axial positioning of the shield 16 at all times. Furthermore, the particular choice of the materials of the two cooperating elements (NMR rubber for the element 28, plastic material, and in particular polyurethane, for the shield 16) allow to minimize the possible contact friction.

As shown in the accompanying FIGURE, the reinforcing insert 7 with the annular sealing element 11 is arranged radially on the outside and coupled in angularly integral manner with the wheel hub 2 to turn with the wheel hub 2 about symmetry axis A of the sealing device 1 in use; vice versa, the shield 16 angularly couples with the spacer 3 and the respective pin 3*b* so as to remain stationary with respect to the reinforcing insert 7 in use, so that the coupling between the radial end 18 of the shield 7, the sleeve portion 8 of the reinforcing insert 7 and the annular sealing element 11 outside the annular chamber 14 determine the creation in the annular chamber 14 of the labyrinth seal 19, which protects the at least one annular lip 12 in use, and a centrifugation of the possible contaminants towards the outside of the annular seat 6, centrifugation made more effective by the fact that the intermediate portion 20 of the shield 16 is shaped so as to form an axial protrusion 31 in front of the L-fold end 15 of the sleeve portion 8 and at a relatively smaller radial distance from a terminal edge 30 of the L-fold end itself.

The invention claimed is:

1. A sealing device insertable between a first and a second member relatively rotatable with respect to each other about an axis coinciding with an axis of symmetry of the sealing device between a wheel hub and a respective support pin of a motor bike wheel or a spacer assembled on the respective support pin, comprising:
   an annular reinforcing insert restrainable in an angularly integral and fluid-tight manner to the first member; and
   an annular sealing element made of an elastomeric material and having at least one annular lip being elastically deformable and adapted to fluid-tightly cooperate with a radial side surface of the second member, the at least one annular lip extending radially and overhangingly from the annular reinforcing insert up to a first radial position; and
   i) an annular chamber defined by the annular reinforcing insert and arranged directly adjacent in the axial direction to the annular sealing element; and
   ii) a shield mounted in the annular chamber and having a first radial end and a second radial end opposite of the first radial end; the first radial end extending up to a second radial position that is axially spaced from the first radial position of the at least one annular lip, wherein the first radial end is configured to cooperate with the radial side surface of the second member, the first radial end configured to be coupled in a forced manner to the second member to restrain the shield in an angularly integral manner to the second member; and the second radial end facing the annular reinforcing insert and cooperating with the annular reinforcing insert and with the annular sealing element to create within the annular chamber a labyrinth seal interposed between the at least one annular lip and an environment external to the first and second member; and wherein
   iii) the shield is mounted in the annular chamber in a floating manner, with both radial and axial play; and
   iv) the annular reinforcing insert is made of a plastically deformable metal material and provides a sleeve portion and a flange portion which extends radially and overhangingly from a first end of the sleeve portion, wherein the at least one annular lip extends from the flange portion on a side opposite of the sleeve portion; the annular chamber being delimited between the flange portion and a second end of the sleeve portion that is opposite the first end of the sleeve portion, wherein the second end of the sleeve portion extends radially inwardly such that the sleeve portion forms an L-shape, and such that the annular chamber extends in the radial direction along only a part of the annular sealing element; and wherein
   v) in a radial cross-section of the shield, the second radial end is delimited by a radial surface extending parallel to the axis of symmetry and by a pair of opposite front radial surfaces perpendicular to the axis of symmetry, each of the front radial surfaces having, at a radial middle portion thereof, a respective annular ridge extending axially and overhanging from their respective front radial surface.

2. The device according to claim 1, wherein the shield is made of a material stiffer than the elastomeric material by which the at least one annular lip is made and, preferably, of a synthetic plastic material.

3. The device according to claim 1, wherein the first radial end of the shield extends radially and overhangingly out from the annular chamber.

4. The device according to claim 1, wherein the annular chamber is engaged only by the second radial end of the shield, wherein a central connection portion of the shield extends between the first and the second radial ends of the shield, wherein the central connection portion faces the annular sealing element and is radially aligned with the second end of the sleeve portion, and wherein the first radial end faces and is axially aligned with the at least one annular lip.

5. The device according to claim 1, wherein each of the respective annular ridges has an arc-of-circle profile in the radial cross-section of the shield.

6. The device according to claim 1, wherein each of the respective annular ridges extend facing and cooperating with the second end of the sleeve portion of the annular reinforcing insert and a portion of the annular sealing element that extends upon the flange portion of the annular reinforcing insert in a direction towards the annular chamber such that the portion of the annular sealing element at least partially covers the flange portion, the portion of the annular sealing element and the radial surface of the second radial end of the shield cooperating to form a part of the labyrinth seal in the annular chamber.

7. The device according to claim 1, wherein the first radial end of the shield is shaped as a truncated cone shaped funnel, having a conicity thereof facing the at least one annular lip.

8. The device according to claim 1, wherein the annular sealing element is made of a low friction coefficient polymer, the annular sealing element extending towards the sleeve portion and inside an annular step obtained on the sleeve portion, the annular step radially located on a side of the sleeve portion opposite of the flange portion and in correspondence with the same so as to exert a static seal on the first member.

9. A wheel hub having a wheel support pin and coupling, the wheel support pin including a spacer mounted thereon, comprising:
   a rolling bearing and
   at least one sealing device having;
      an annular reinforcing insert restrainable in an angularly integral and fluid-tight manner to the wheel hub; and
      an annular sealing element made of an elastomeric material and having at least one annular lip being elastically deformable and adapted to fluid-tightly cooperate with a radial side surface of the spacer, the at least one annular lip extending radially and overhangingly from the annular reinforcing insert up to a first radial position; and
      i) an annular chamber defined by the annular reinforcing insert and arranged directly adjacent in the axial direction to the annular sealing element; and
      ii) a shield mounted in the annular chamber and having a first radial end and a second radial end opposite of the first radial end; the first radial end extending up to a second radial position that is axially spaced from the first radial position of the at least one annular lip, wherein the first radial end is configured to cooperate with the radial side surface of the spacer, the first radial end configured to be coupled in a forced manner to the spacer to restrain the shield in an angularly integral manner to the spacer; and the second radial end facing the annular reinforcing insert and cooperating with the annular reinforcing insert and with the annular sealing element to create within the annular chamber a labyrinth seal interposed between the at least one annular lip and an environment external to the wheel hub and the spacer; and wherein
      iii) the shield is mounted in the annular chamber in a floating manner, with both radial and axial play; and
      iv) the annular reinforcing insert is made of a plastically deformable metal material and provides a sleeve portion and a flange portion which extends radially and overhangingly from a first end of the sleeve portion, wherein the at least one annular lip extends from the flange portion on a side opposite of the sleeve portion; the annular chamber being delimited between the flange portion and a second end of the sleeve portion that is opposite the first end of the sleeve portion, wherein the second end of the sleeve portion extends radially inwardly such that the sleeve portion forms an L-shape, and such that the annular chamber extends in the radial direction along only a part of the annular sealing element; and wherein
      v) in a radial cross-section of the shield, the second radial end is delimited by a radial surface extending parallel to an axis of symmetry and by a pair of opposite front radial surfaces perpendicular to the axis of symmetry, each of the front radial surfaces having, at a radial middle portion thereof, a respective annular ridge extending axially and overhanging from their respective front radial surface, and wherein
the at least one sealing device is inserted in an annular seat defined between the wheel hub and the wheel support pin or the spacer, and wherein
the annular reinforcing insert and the annular sealing element are arranged radially on the outside and coupled in angularly integral manner with the wheel hub such that the annular reinforcing insert and the annular sealing element turn together with the wheel hub about the axis of symmetry of the sealing device, and wherein the shield is coupled in angularly integral manner with the wheel support pin or the spacer so as to remain stationary during use with respect to the annular reinforcing insert, so that the cooperation between the second radial end of the shield, the sleeve portion of the annular reinforcing insert and the annular sealing element of the annular chamber create the labyrinth seal within the annular chamber during use.

* * * * *